United States Patent
Lin

(10) Patent No.: US 9,961,360 B2
(45) Date of Patent: May 1, 2018

(54) MOTION VECTOR LIST CONSTRUCTING METHOD AND SYSTEM FOR VIDEO CODING

(71) Applicant: Huawei Technologies Co., Ltd., Shenzhen (CN)

(72) Inventor: Yongbing Lin, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 318 days.

(21) Appl. No.: 14/788,248

(22) Filed: Jun. 30, 2015

(65) Prior Publication Data

US 2015/0382011 A1  Dec. 31, 2015

(30) Foreign Application Priority Data

Jun. 30, 2014  (CN) .......................... 2014 1 0307197

(51) Int. Cl.
 *H04N 7/12* (2006.01)
 *H04N 11/02* (2006.01)
 (Continued)

(52) U.S. Cl.
 CPC ......... *H04N 19/513* (2014.11); *H04N 19/137* (2014.11); *H04N 19/176* (2014.11);
 (Continued)

(58) Field of Classification Search
 USPC .................................................... 375/240.16
 See application file for complete search history.

(56) References Cited

U.S. PATENT DOCUMENTS

2012/0163466 A1  6/2012  Sugio et al.
2014/0168363 A1  6/2014  Kang et al.
(Continued)

FOREIGN PATENT DOCUMENTS

CN  102946536 A  2/2013
CN  103747264 A  4/2014
(Continued)

OTHER PUBLICATIONS

"CE3 related: Simplifications to sub-PU level inter-view motion prediction," Joint Collaborative Team on 3D Video Coding Extensions of ITU-T SG 16 WP 3 and ISO/IEC JTC 1/SC 29NVG 11, $6^{TH}$ Meeting: Geneva, CH, International Telecommunications Union, Geneva, Switzerland (Oct. 25-Nov. 1, 2013).
(Continued)

*Primary Examiner* — Chikaodili E Anyikire
(74) *Attorney, Agent, or Firm* — Leydig, Voit & Mayer, Ltd.

(57) ABSTRACT

The present invention discloses a motion vector list constructing method and system for video coding. The motion vector list constructing method for video coding includes: obtaining a motion information candidate list that is based on a spatially neighboring block and a time-domain corresponding block and that is of a current prediction block; obtaining sub motion information candidates that are of multiple sub blocks of the current prediction block and that are based on inter-view corresponding blocks of the multiple sub blocks of the current prediction block; determining availability of the sub motion information candidates of the multiple sub blocks; and updating the motion information candidate list by using one sub motion information candidate of at least one available sub motion information candidate.

15 Claims, 3 Drawing Sheets

(51) Int. Cl.
| | |
|---|---|
| *H04N 11/04* | (2006.01) |
| *H04N 19/513* | (2014.01) |
| *H04N 19/597* | (2014.01) |
| *H04N 19/52* | (2014.01) |
| *H04N 19/137* | (2014.01) |
| *H04N 19/176* | (2014.01) |
| *H04N 19/593* | (2014.01) |

(52) U.S. Cl.
CPC ........... *H04N 19/52* (2014.11); *H04N 19/593* (2014.11); *H04N 19/597* (2014.11)

(56) References Cited

U.S. PATENT DOCUMENTS

| | | | |
|---|---|---|---|
| 2015/0085933 A1* | 3/2015 | Yie .................... | H04N 13/0048 375/240.16 |
| 2015/0085935 A1* | 3/2015 | Chen .................... | H04N 19/597 375/240.16 |
| 2015/0181232 A1 | 6/2015 | Takahashi | |
| 2015/0215640 A1 | 7/2015 | Lin | |

FOREIGN PATENT DOCUMENTS

| | | |
|---|---|---|
| CN | 104079944 A | 10/2014 |
| WO | WO 2013068547 A2 | 5/2013 |
| WO | WO 2014013880 A1 | 1/2014 |

OTHER PUBLICATIONS

"3D-CE1: Simplification of 3D Merge list construction," Joint Collaborative Team on 3D Video Coding Extensions of ITU-T SG 16 WP 3 and ISO/IEC JTC 1/SC 29/WG 11, 8$^{th}$ Meeting: Valencia, ES, International Telecommunications Union, Geneva, Switzerland (Mar. 29-Apr. 4, 2014).

"Test Model 8 of 3D-HEVC and MV-HEVC," Joint Collaborative Team on 3D Video Coding Extensions of ITU-T SG 16 WP 3 and ISO/IEC JTC 1/SC 29/WG 11, 8$^{th}$ Meeting: Valencia, ES, International Telecommunications Union, Geneva, Switzerland (Mar. 29-Apr. 4, 2014).

* cited by examiner

MOTION VECTOR LIST CONSTRUCTING METHOD AND SYSTEM FOR VIDEO CODING

CROSS-REFERENCE TO RELATED APPLICATIONS

This application claims priority to Chinese Patent Application No. 201410307197.3, filed on Jun. 30, 2014, which is hereby incorporated by reference in its entirety.

TECHNICAL FIELD

This application relates to the field of video coding technologies, and in particular, to a motion vector list constructing method and system for video coding.

BACKGROUND

With development and popularity of the Internet industry and a digital television, a digital video has inadvertently entered our daily life, and has been deeply integrated with various daily businesses, creating an inextricable link. Video compression is an indispensable technology in digital video application. The video compression refers to that redundant information in digital video data is removed by using a data compression technology, so as to reduce a data amount required to represent an original video, and facilitate transmission and storage of video data.

In a conventional video compression technology, a motion vector list of a current prediction block generally needs to be constructed. A conventional method for constructing a motion vector list of a current prediction block is as follows: firstly, a motion information candidate list (Candidate List) that is based on a spatially neighboring block and a time-domain corresponding block and that is of the current prediction block is obtained; after that, sub motion information candidates that are of multiple sub blocks of the current prediction block and that are based on inter-view corresponding blocks of the multiple sub blocks of the current prediction block are obtained, and a preferred sub motion information candidate is selected from the sub motion information candidates of the multiple sub blocks; and further, one candidate is selected from the motion information candidate list, and motion information of the candidate and information about a location of the candidate in the list are obtained; when the candidate has motion information, it is determined whether the motion information of the candidate is the same as motion information of the preferred sub motion information candidate; if they are different, the preferred sub motion information candidate is inserted into the motion information candidate list, or if they are the same, insertion is skipped; or when the candidate has no motion information, another candidate needs to be selected, and motion information of the another candidate and information about a location of the another candidate in the list are obtained; when the candidate has motion information, it is determined whether the motion information of the candidate is the same as motion information of the preferred sub motion information candidate, and then it is determined, according to a result of the determining, whether to insert the preferred sub motion information candidate into the motion information candidate list.

In a process of constructing a motion vector list, a candidate needs to be selected from the motion information candidate list, and motion information of the candidate and information about a location of the candidate in the list need to be obtained; when the candidate has motion information, it is determined whether the motion information of the candidate is the same as motion information of the preferred sub motion information candidate, and then it is determined, according to a result of the determining, whether to insert the preferred sub motion information candidate into the motion information candidate list; or when the candidate has no motion information, another candidate needs to be selected from the motion information candidate list for performing the foregoing operation, therefore, the foregoing method for constructing a motion vector list has relatively high complexity, and takes a relatively long time.

SUMMARY

Embodiments of this application provide a motion vector list constructing method and system for video coding, thereby resolving a technical problem in the prior art.

A first aspect of the embodiments of this application provides a motion vector list constructing method for video coding, where the method includes: obtaining a motion information candidate list that is based on a spatially neighboring block and a time-domain corresponding block and that is of a current prediction block; obtaining sub motion information candidates that are of multiple sub blocks of the current prediction block and that are based on inter-view corresponding blocks of the multiple sub blocks of the current prediction block; determining availability of the sub motion information candidates of the multiple sub blocks; and updating the motion information candidate list by using one sub motion information candidate of at least one available sub motion information candidate.

In a first possible implementation manner of the first aspect, the determining availability of the multiple sub motion information candidates specifically includes: determining whether the multiple sub blocks have motion information; and determining a sub motion information candidate corresponding to a sub block having motion information as the at least one available sub motion information candidate.

With reference to the first aspect or the first possible implementation manner of the first aspect, in a second possible implementation manner of the first aspect, the updating the motion information candidate list by using one sub motion information candidate of at least one available sub motion information candidate is specifically: inserting the sub motion information candidate in front of a first candidate in the motion information candidate list when a texture image is processed, or inserting the sub motion information candidate into a location, except a location in front of a first candidate, in the motion information candidate list when a depth image is processed.

In a third possible implementation manner of the first aspect, the determining availability of the multiple sub motion information candidates specifically includes: determining whether the multiple sub blocks have motion information; and if the multiple sub blocks all have motion information, determining whether the motion information of the multiple sub blocks is the same; and when the multiple pieces of motion information are the same, determining the sub motion information candidates as the at least one available sub motion information candidate; and the updating the motion information candidate list by using one sub motion information candidate of at least one available sub motion information candidate is specifically: replacing a first candidate in the motion information candidate list with one sub motion information candidate of the multiple sub motion information candidates.

In a fourth possible implementation manner of the first aspect, the determining availability of the multiple sub motion information candidates specifically includes: determining whether the multiple sub blocks have motion information; if at least one sub block of the multiple sub blocks has no motion information, filling in the at least one sub block having no motion information with motion information; determining whether motion information of the multiple sub blocks is the same; when the multiple pieces of motion information are the same, determining the multiple sub motion information candidates as the at least one available sub motion information candidate; and the updating the motion information candidate list by using one sub motion information candidate of at least one available sub motion information candidate is specifically: replacing a first candidate in the motion information candidate list with one sub motion information candidate of the multiple sub motion information candidates.

With reference to the fourth possible implementation manner of the first aspect, in a fifth possible implementation manner of the first aspect, the filling in the at least one sub block having no motion information with motion information is specifically: filling in the at least one sub block having no motion information with motion information by using motion information of a time-domain corresponding sub block or a spatially neighboring sub block of the at least one sub block having no motion information.

With reference to the first aspect, or any one of the first to fifth possible implementation manners of the first aspect, in a sixth possible implementation manner of the first aspect, the updating the motion information candidate list by using one sub motion information candidate of at least one available sub motion information candidate is specifically: updating the motion information candidate list by using a sub motion information candidate of a sub motion information candidate of a sub block that is located at a non-edge location and that is one of at least one sub block corresponding to the at least one available sub motion information candidate.

A second aspect of the embodiments of this application provides a motion vector list constructing system for video coding, where the system includes:
  an obtaining unit, configured to obtain a motion information candidate list that is based on a spatially neighboring block and a time-domain corresponding block and that is of a current prediction block; and configured to obtain sub motion information candidates that are of multiple sub blocks of the current prediction block and that are based on inter-view corresponding blocks of the multiple sub blocks of the current prediction block;
  a determining unit, configured to determine availability of the sub motion information candidates of the multiple sub blocks; and
  a control unit, configured to update the motion information candidate list by using one sub motion information candidate of at least one available sub motion information candidate.

In a first possible implementation manner of the second aspect, the determining unit is specifically configured to determine whether the multiple sub blocks have motion information, and determine a sub motion information candidate corresponding to a sub block having motion information as the at least one available sub motion information candidate.

With reference to the second aspect or the first possible implementation manner of the second aspect, in a second possible implementation manner of the second aspect, the control unit is specifically configured to: insert the sub motion information candidate in front of a first candidate in the motion information candidate list when a texture image is processed, or insert the sub motion information candidate into a location, except in front of a first candidate, in the motion information candidate list when a depth image is processed.

In a third possible implementation manner of the second aspect, the determining unit is specifically configured to: determine whether the multiple sub blocks have motion information; and if the multiple sub blocks all have motion information, determine whether the motion information of the multiple sub blocks is the same; and when the multiple pieces of motion information are the same, determine the multiple sub motion information candidates as the at least one available sub motion information candidate; and the control unit is specifically configured to replace a first candidate in the motion information candidate list with one sub motion information candidate of the multiple sub motion information candidates.

In a fourth possible implementation manner of the second aspect, the determining unit is specifically configured to: determine whether the multiple sub blocks have motion information; and if at least one sub block of the multiple sub blocks has no motion information, fill in the at least one sub block having no motion information with motion information; determine whether motion information of the multiple sub blocks is the same; and when the multiple pieces of motion information are the same, determine the multiple sub motion information candidates as the at least one available sub motion information candidate; and
  the control unit is specifically configured to replace a first candidate in the motion information candidate list with one sub motion information candidate of the multiple sub motion information candidates.

With reference to the fourth possible implementation manner of the second aspect, in a fifth possible implementation manner of the second aspect, the determining unit is specifically configured to fill in the at least one sub block having no motion information with motion information by using motion information of a time-domain corresponding sub block or a spatially neighboring sub block of the at least one sub block having no motion information.

With reference to the second aspect and any one of the first to fifth possible implementation manners of the second aspect, in a sixth possible implementation manner of the second aspect, the motion parameter candidate list is updated by using a motion information candidate of a sub block that is located at a non-edge location and that is one of at least one sub block corresponding to the at least one available sub motion information candidate.

A beneficial effect of the embodiments of this application is as follows:

In the foregoing motion vector list constructing method and system for video coding of this application, after a motion information candidate list of a current prediction block and sub motion information candidates of multiple sub blocks of the current prediction block are obtained, the motion information candidate list is directly updated by using one sub motion information candidate of at least one available sub motion information candidate of the sub motion information candidates of the multiple sub blocks, and there is no need to determine whether sub motion information that is used to update the motion information candidate list is the same as motion information of a candidate in the candidate list, and then to determine whether to update the motion information candidate list, thereby reducing complexity of constructing the motion vector list of the current prediction block, reducing time spent, and resolving a technical problem in the prior art that complexity of constructing a motion vector list is relatively high, and time spent is relatively long, where the problem is caused by: in a process of constructing a motion vector list, a candidate needs to be selected from the motion information candidate list, and motion information of the candidate and information about a location of the candidate in the list need to be obtained; when the candidate has motion information, it is determined whether the motion information of the candidate is the same as motion information of a preferred sub motion information candidate; and then it is determined whether to insert the preferred sub motion information candidate into the motion information candidate list.

BRIEF DESCRIPTION OF DRAWINGS

To describe the technical solutions in the embodiments of the present application more clearly, the following briefly introduces the accompanying drawings required for describing the embodiments. Apparently, the accompanying drawings in the following description show merely some embodiments of the present application.

DESCRIPTION OF EMBODIMENTS

To make a person skilled in the art understand the technical solutions in the present application better, the following clearly describes the technical solutions in the embodiments of the present application with reference to the accompanying drawings in the embodiments of the present application. Apparently, the described embodiments are merely a part rather than all of the embodiments of the present application.

Embodiment 1

Figure 1:
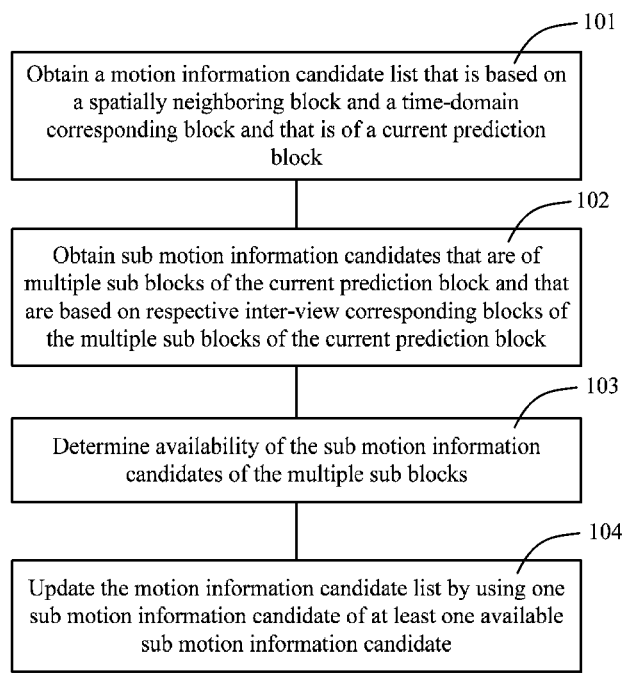
FIG. 1 is a flowchart of a motion vector list constructing method for video coding according to an embodiment of this application.

As shown in FIG. 1, FIG. 1 is a flowchart of a motion vector list constructing method for video coding according to the embodiment of this application. The motion vector list constructing method for video coding is applied to a compression technology of digital video coding. The video coding refers to a manner of converting a file in a video format into a file in another video format by using a specific compression technology (such as MPEG-2, H.263, and AVC). With rapid development of a multimedia technology, a three-dimensional video has become a significant application field. The three-dimensional video can provide more real stereoscopic vision experience for a user.

Specifically, the motion vector list constructing method for video coding provided by the embodiment of this application is applied in a three-dimensional video coding technology, for example, a three-dimensional coding technology such as HEVC (High Efficiency Video Coding). According to the three-dimensional coding technology, a neighboring reconstructed pixel is used to perform intra-frame prediction for a current block, and a prediction motion vector is selected from a motion vector of a neighboring block to construct a motion vector list to perform inter-frame motion compensated prediction.

In the three-dimensional coding technology, three concepts, that is, a coding unit (Coding Unit, CU), a prediction unit (Prediction Unit, PU), and a transform unit (Transform Unit, TU) are used to describe an entire coding process. The CU is a macroblock or a sub-macroblock, each CU is a 2N×2N pixel block (N is 2 raised to a power). A prediction process of each CU is implemented by using a PU, where a size of the PU depends on the CU, and may be a square (such as 2N×2N, N×N), or may be a rectangle (2N×N, N×2N).

Figures 2, 3:
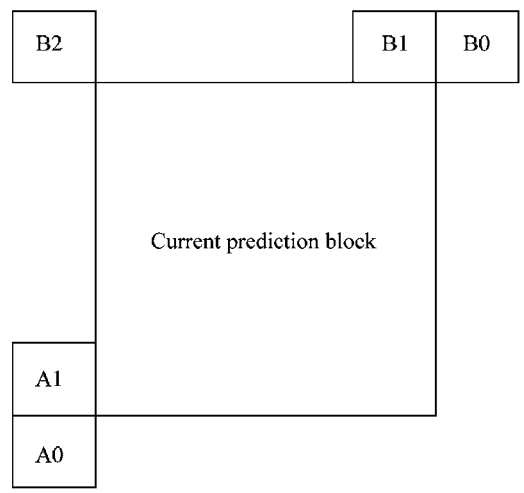
FIG. 2 is a schematic diagram of a location of a current prediction block in the motion vector list constructing method in FIG. 1.
FIG. 3 is a schematic diagram of the current prediction block in FIG. 2 divided into sub blocks.

The motion vector list constructing method for video coding includes the following steps:

Step 101: Obtain a motion information candidate list that is based on a spatially neighboring block and a time-domain corresponding block and that is of a current prediction block (PU, Prediction Unit). The spatially neighboring block is a block whose location is neighboring to that of the current prediction block. As shown in FIG. 2, A0, A1, B0, B1, B2 are all spatially neighboring blocks of the current prediction block, where A0 is a diagonal block at a lower left corner of the current prediction block, A1 is a left side block at the lower left corner of the current prediction block, B0 is a diagonal block at an upper right corner of the current prediction block, B1 is an upper side block located at the upper right corner of the prediction block, and B2 is a diagonal block at an upper left corner of the current prediction block. In addition, all the spatially neighboring blocks carry motion information and location information, that is, A0, A1, B0, B1, B2 all carry the motion information, and the location information of the spatially neighboring blocks relative to the current motion block. The time-domain corresponding block is a TMVP (Temporal Motion Vector prediction) block, and the time-domain corresponding block is a reference block that is of a frame time in front of a frame at which the current prediction block is located and that is corresponding to the current prediction block. Exemplarily, a traversal process of availability of the spatially neighboring block and the time-domain corresponding block is sequentially A1->B1->B0->A0->B2->TMVP, that is, the motion information candidate list that is based on the spatially neighboring blocks and the time-domain corresponding block and that is of the current prediction block is A1->B1->B0->A0->B2->TMVP.

Step 102: Obtain sub motion information candidates that are of multiple sub blocks (Sub-PU) of the current prediction block and that are based on inter-view corresponding blocks of the multiple sub blocks of the current prediction block. When it is required to obtain the sub motion information candidates that are of the multiple sub blocks of the current prediction block and that are based on the inter-view corresponding blocks of the multiple sub blocks of the current prediction block, the current prediction block first needs to be divided into several sub blocks of the same size. As shown in FIG. 3, an example in which a 32×32 current prediction block in FIG. 3 is divided into 16 sub blocks of an 8×8 size is used for description, where sequence numbers of the 16 sub blocks are 0 to 15. Each sub block is traversed, and a corresponding block in a reference view is found for each sub block according to disparity vector (DV Disparity Vector) information, so as to obtain sub motion information candidates (IV-MCP, Inter-view Motion Compensated Prediction) that are of multiple sub blocks (Sub-PU) and that are based on inter-view corresponding blocks of the multiple sub blocks. In another implementation manner, a 64×64 current prediction block may also be divided, so as to obtain sub motion information candidates that are of multiple sub blocks (Sub-PU) and that are based on inter-view corresponding blocks of the multiple sub blocks. For example, the 64×64 current prediction block is divided into 16 16×16 sub blocks or 64 8×8 sub blocks, each sub block is traversed, a corresponding block in a reference view is found for each sub block according to disparity vector information, and the sub motion information candidates that are of the multiple sub blocks and that are based on the inter-view corresponding blocks of the multiple sub blocks may also be obtained.

Step 103: Determine availability of the sub motion information candidates of the multiple sub blocks. Specifically, availability of a corresponding sub motion information candidate is determined according to motion information of a sub block. There are at least three availability results of the sub motion information candidates of the multiple sub blocks, including: a first result is that the sub motion information candidates of the multiple sub blocks are all available, a second result is that the sub motion information candidates of the multiple sub blocks are all unavailable, and a third result is that at least one sub motion information candidate of the sub motion information candidates of the multiple sub blocks is available.

Step 104: Update the motion information candidate list by using one sub motion information candidate of at least one available sub motion information candidate.

Specifically, there may be one or multiple available sub motion information candidates. A sub motion information candidate of a sub block that is located at an edge location and that is one of the multiple sub blocks may be selected to update the motion information candidate list, or a sub block that is located at a non-edge location and that is one of the multiple sub blocks may be used to update the motion information candidate list. As shown in FIG. 3, a sub motion information candidate of any sub block of sub block 0, sub block 1, sub block 2, sub block 3, sub block 4, sub block 7, sub block 8, sub block 11, sub block 12, sub block 13, sub block 14, and sub block 15 may be selected to update the motion information candidate list, or a sub motion information candidate of any sub block of sub block 5, sub block 6, sub block 9, and sub block 10 may be selected to update the motion information candidate list. Preferably, a sub motion information candidate of a sub block that is located at a non-edge location and that is one of the multiple sub blocks is used to update the motion information candidate list, that is, the sub motion information candidate of any sub block of sub block 5, sub block 6, sub block 9, and sub block 10 is selected to update the motion information candidate list.

In addition, the updating manners specifically include:

1: Insert the sub motion information candidate in front of a first candidate in the motion information candidate list when a texture image is processed. That is, an updated motion information candidate list is IV-MCP->A1->B1->B0->A0->B2->TMVP. In the implementation manner, the texture image is specifically a color image.

2: Insert the sub motion information candidate into a location, except in front of a first candidate, in the motion information candidate list when a depth image is processed. That is, an updated motion information candidate list may be A1->IV-MCP->B1->B0->A0->B2->TMVP, or may be A1->B1->IV-MCP->B0->A0->B2->TMVP, or the like. In the implementation manner, the depth image is specifically a grayscale image, and each pixel grayscale value represents depth information.

3: Replace a first candidate in the motion information candidate list with one sub motion information candidate of the multiple sub motion information candidates. That is, an updated motion information candidate list is IV-MCP->B1->B0->A0->B2->TMVP.

In addition, if the sub motion information candidates of the multiple sub motion blocks are all unavailable, there is no need to update the motion information candidate list.

In the foregoing motion vector list constructing method for video coding, after a motion information candidate list of a current prediction block and sub motion information candidates of multiple sub blocks of the current prediction block are obtained, the motion information candidate list is directly updated by using one sub motion information candidate of at least one available sub motion information candidate of the sub motion information candidates of the multiple sub blocks, and there is no need to determine whether sub motion information that is used to update the motion information candidate list is the same as motion information of a candidate in the candidate list, or further to determine whether to update the motion information candidate list, thereby reducing complexity of constructing the motion vector list of the current prediction block, reducing time spent, and resolving a technical problem in the prior art that complexity of constructing a motion vector list is relatively high, and time spent is relatively long, where the problem is caused by: in a process of constructing a motion vector list, one candidate needs to be selected from the motion information candidate list, and motion information of the candidate and information about a location of the candidate in the list need to be obtained, and when the candidate has motion information, it is determined whether the motion information of the candidate is the same as motion information of the preferred sub motion information candidate; and then it is determined whether to insert the preferred sub motion information candidate into the motion information candidate list.

In a specific implementation process, the determining availability of the sub motion information candidates of the multiple sub blocks is specifically: determining whether the multiple sub blocks have motion information, and determining whether the multiple sub motion information candidates are available according to whether the multiple sub blocks have motion information, where specific determining manners are as follows:

First manner: when the multiple sub blocks all have no motion information, it is directly determined that the multiple sub motion information candidates are unavailable, where the motion information candidate list does not need to be updated.

Second manner: when at least one sub block of the multiple sub blocks has no motion information, the at least one sub block having no motion information is filled in with motion information, and then it is determined whether motion information of the multiple sub blocks is the same. When the motion information of all the sub blocks is the same, it is determined that the sub motion information candidates are unavailable. When the motion information of all the sub blocks is different, it may be determined that the sub motion information candidates are available; the sub motion information candidate is inserted in front of the first candidate in the motion information candidate list when a texture image is processed; and the sub motion information candidate is inserted into a location, except in front of the first candidate, in the motion information candidate list when a depth image is processed.

When the motion information of all the sub blocks is the same, motion information of the sub motion information candidates of the sub blocks actually has degenerated from a sub block level to a prediction block level, and in this case, a possibility that a sub motion information candidate is the same as a candidate in the motion information candidate list is relatively high, and therefore, the sub motion information candidate may be processed as unavailable, thereby further helping to reduce a possibility that a final motion information candidate list includes same candidates, and helping to increase coding compression performance.

Specifically, when the at least one sub block having no motion information is filled in with motion information, motion information of a time-domain corresponding sub block or a spatially neighboring sub block of the at least one sub block having no motion information may be used to fill in the at least one sub block having no motion information with motion information. Specifically, the time-domain corresponding block of the at least one sub block is a corresponding sub block at a frame before a frame at which the at least one sub block is located, and the spatially neighboring sub block of the at least one sub block is a sub block spatially neighboring to the at least one sub block.

Third manner: when at least one sub block of the multiple sub blocks has no motion information, the at least one sub block having no motion information is filled in with motion information, and then it is determined whether motion information of the multiple sub blocks is the same. In the manner, a manner for filling in the at least one sub block having no motion information with motion information is the same as a manner, in the second manner, of filling in the at least one sub block having no motion information with motion information.

When the motion information of all the sub blocks is the same, the multiple sub motion information candidates are determined as the at least one available sub motion information candidate. In this case, the updating the motion information candidate list by using one sub motion information candidate of at least one available sub motion information candidate is specifically: replacing the first candidate in the motion information candidate list with one sub motion information candidate of the multiple sub motion information candidates.

When the motion information of all the sub blocks is different, it may also be determined that the sub motion information candidates are available; the sub motion information candidate is inserted in front of the first candidate in the motion information candidate list when a texture image is processed; and the sub motion information candidate is inserted into a location, except in front of the first candidate, in the motion information candidate list when a depth image is processed.

When the motion information of all the sub blocks is the same, motion information of the sub motion information candidates of the sub blocks actually has degenerated from a sub block level to a prediction block level, and in this case, a possibility that a sub motion information candidate is the same as a candidate, especially the first candidate, in the motion information candidate list is relatively high, and therefore, the first candidate in the motion information candidate list may further be directly replaced with the sub motion information candidate. A sub motion information candidate is a motion information candidate obtained by inter-view prediction (obtained based on motion relevance prediction of different views), and has higher prediction accuracy compared with a candidate (obtained based on motion relevance prediction of a space-domain neighboring block and a time-domain corresponding block that are of a current view) in the motion information candidate list, and therefore, the manner of directly replacing the first candidate in the motion information candidate list with the sub motion information candidate not only avoids a possibility that the original first candidate is the same as the first candidate in the motion information candidate list, but also a sub motion information candidate having higher prediction accuracy may be used, thereby helping to increase coding compression performance.

Fourth manner: when the multiple sub blocks all have motion information, it is directly determined whether the motion information of the multiple sub blocks is the same, and when the motion information of all the sub blocks is the same, it is determined that the multiple sub motion information candidates are all unavailable.

When the motion information of all the sub blocks is the same, motion information of the sub motion information candidates of the sub blocks actually has degenerated from a sub block level to a prediction block level, and in this case, a possibility that a sub motion information candidate is the same as a candidate in the motion information candidate list is relatively high, and therefore, the sub motion information candidate may be processed as unavailable, thereby further helping to reduce a possibility that a final motion information candidate list includes same candidates, and helping to increase coding compression performance.

When the motion information of all the sub blocks is different, it may be determined that the sub motion information candidates are available; the sub motion information candidate is inserted in front of the first candidate in the motion information candidate list when a texture image is processed; and the sub motion information candidate is inserted into a location, except in front of the first candidate, in the motion information candidate list when a depth image is processed.

Fifth manner: when the multiple sub blocks all have motion information, it is directly determined whether the motion information of the multiple sub blocks is the same.

When the multiple pieces of motion information are the same, the multiple sub motion information candidates are determined as the at least one available sub motion information candidate. In this case, the updating the motion information candidate list by using one sub motion information candidate of at least one available sub motion information candidate is specifically: replacing the first candidate in the motion information candidate list with one sub motion information candidate of the multiple sub motion information candidates.

When the motion information of all the sub blocks is the same, motion information of the sub motion information candidates of the sub blocks actually has degenerated from a sub block level to a prediction block level, and in this case, a possibility that a sub motion information candidate is the same as a candidate, especially the first candidate, in the motion information candidate list is relatively high, and therefore, the first candidate in the motion information candidate list may further be directly replaced with the sub motion information candidate. A sub motion information candidate is a motion information candidate obtained by inter-view prediction (obtained based on motion relevance prediction of different views), and has higher prediction accuracy compared with a candidate (obtained based on motion relevance prediction of a space-domain neighboring block and a time-domain corresponding block that are of a current view) in the motion information candidate list, and therefore, the manner of directly replacing the first candidate in the motion information candidate list with the sub motion information candidate not only avoids a possibility that the original first candidate is the same as the first candidate in the motion information candidate list, but also a sub motion information candidate having higher prediction accuracy may be used, thereby helping to increase coding compression performance.

When the motion information of all the sub blocks is different, it may also be determined that the sub motion information candidates are available; the sub motion information candidate is inserted in front of the first candidate in the motion information candidate list when a texture image is processed; and the sub motion information candidate is inserted into a location, except in front of the first candidate, in the motion information candidate list when a depth image is processed.

Sixth manner: when all or at least one of the multiple sub blocks has motion information, a sub motion information candidate corresponding to a sub block having motion information is determined as the at least one available sub motion information candidate. That is, when one sub block of the multiple sub blocks has motion information, a sub motion information candidate corresponding to the sub block is directly determined as the at least one available sub motion information candidate; and when all of or at least one sub block of the multiple sub blocks has motion information, no matter whether the motion information is the same, a sub motion information candidate corresponding to a sub block having motion information may be directly determined as the available sub motion information candidate.

In this case, the sub motion information candidate is inserted in front of the first candidate in the motion information candidate list when a texture image is processed; and the sub motion information candidate is inserted into a location, except in front of the first candidate, in the motion information candidate list when a depth image is processed.

Specifically, it may be determined whether the sub block has motion information according to a coding manner of the sub block; if the coding manner of the sub block is intra-frame coding, it is determined that the sub block has no motion information; or if the coding manner of the sub block is inter-frame coding, it is determined that the sub block has motion information.

Further, after a sub block having no motion information is filled in with motion information by using motion information of a sub block having motion information, or when the multiple sub blocks all have motion information, and the motion information of the multiple sub blocks is the same, the updating the motion information candidate list by using one sub motion information candidate of the multiple sub motion information candidates is specifically: replacing the first candidate in the motion information candidate list with one sub motion information candidate of the multiple sub motion information candidates. That is, A1 in the motion information candidate list is directly replaced with the sub motion information candidate (IV-MCP), that is, an updated motion information candidate list is IV-MCP->B1->B0->A0->B2->TMVP.

Embodiment 2

Based on a same inventive idea, this application further provides a motion vector list constructing system 200 for video coding. The motion vector list constructing system 200 is configured to execute a video coding technology, where the video coding refers to a manner of converting a file in a video format into a file in another video format by using a specific compression technology (such as MPEG-2, H.263, and AVC). With rapid development of a multimedia technology, a three-dimensional video has become a significant application field. The three-dimensional video can provide more real stereoscopic vision experience for a user.

Specifically, the motion vector list constructing system 200 of this application is configured to execute a three-dimensional video coding technology, for example, a three-dimensional coding technology such as HEVC (High Efficiency Video Coding). According to the three-dimensional coding technology, a neighboring reconstructed pixel is used to perform intra-frame prediction for a current block, and a prediction motion vector is selected from a motion vector of a neighboring block to construct a motion vector list to perform inter-frame motion compensated prediction.

In the three-dimensional coding technology, three concepts, that is, a coding unit (Coding Unit, CU), a prediction unit (Prediction Unit, PU), and a transform unit (Transform Unit, TU) are used to describe an entire coding process. The CU is a macroblock or a sub-macroblock, each CU is a 2N×2N pixel block (N is 2 raised to a power). A prediction process of each CU is implemented by using a PU, where a size of the PU depends on the CU, and may be a square (such as 2N×2N, N×N), or may be a rectangle (2N×N, N×2N).

Figure 4:
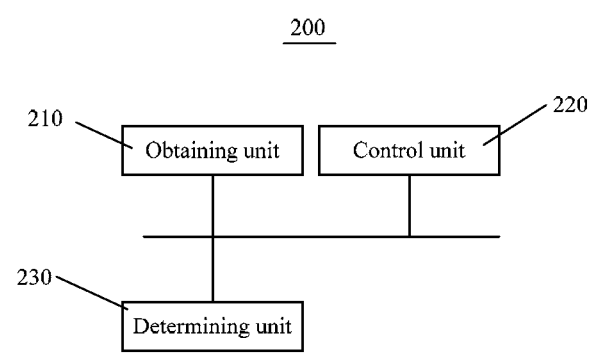
FIG. 4 is a schematic structural diagram of a motion vector list constructing system for video coding according to another embodiment of this application.

As shown in FIG. 4, FIG. 4 is a schematic structural diagram of the motion vector list constructing system 200 for video coding. The motion vector list constructing system 200 for video coding includes an obtaining unit 210, a control unit 220, and a determining unit 230.

The obtaining unit 210 is configured to obtain a motion information candidate list that is based on a spatially neighboring block and a time-domain corresponding block and that is of a current prediction block; and configured to obtain sub motion information candidates that are of multiple sub blocks of the current prediction block and that are based on inter-view corresponding blocks of the multiple sub blocks of the current prediction block.

The spatially neighboring block is a block whose location is neighboring to that of the current prediction block. As shown in FIG. 2, A0, A1, B0, B1, B2 are all spatially neighboring blocks of the current prediction block, where A0 is a diagonal block at a lower left corner of the current prediction block, A1 is a left side block at the lower left corner of the current prediction block, B0 is a diagonal block at an upper right corner of the current prediction block, B1 is an upper side block located at the upper right corner of the prediction block, and B2 is a diagonal block at an upper left corner of the current prediction block. In addition, all the spatially neighboring blocks carry motion information and location information, that is, A0, A1, B0, B1, B2 all carry the motion information, and the location information of the spatially neighboring blocks relative to the current motion block. The time-domain corresponding block is a TMVP (Temporal Motion Vector prediction) block, and the time-domain corresponding block is a reference block that is at a time before a time corresponding to the current prediction block and that is corresponding to the current prediction block. Exemplarily, a traversal process of availability of the spatially neighboring block and the time-domain corresponding block is sequentially A1->B1->B0->A0->B2->TMVP, that is, the motion information candidate list that is based on the spatially neighboring blocks and the time-domain corresponding block and that is of the current prediction block is A1->B1->B0->A0->B2->TMVP.

When the obtaining unit 210 needs to obtain the sub motion information candidates that are of the multiple sub blocks of the current prediction block and that are based on the inter-view corresponding blocks of the multiple sub blocks of the current prediction block, the current prediction block first needs to be divided into several sub blocks of the same size. As shown in FIG. 3, an example in which a 32×32 current prediction block in FIG. 3 is divided into 16 sub blocks of an 8×8 size is used for description, where sequence numbers of the 16 sub blocks are 0 to 15. Each sub block is traversed, and a corresponding block in a reference view is found for each sub block according to disparity vector (DV Disparity Vector) information, so as to obtain sub motion information candidates (IV-MCP, Inter-view Motion Compensated Prediction) that are of multiple sub blocks (Sub-PU) and that are based on inter-view corresponding blocks of the multiple sub blocks. In another implementation manner, a 64×64 current prediction block may also be divided, so as to obtain sub motion information candidates that are of multiple sub blocks (Sub-PU) and that are based on inter-view corresponding blocks of the multiple sub blocks. For example, the 64×64 current prediction block is divided into 16 16×16 sub blocks or 64 8×8 sub blocks, each sub block is traversed, a corresponding block in a reference view is found for each sub block according to disparity vector information, and the sub motion information candidates that are of the multiple sub blocks and that are based on the inter-view corresponding blocks of the multiple sub blocks may also be obtained.

The determining unit 230 is configured to determine availability of the sub motion information candidates of the multiple sub blocks. Specifically, availability of a corresponding sub motion information candidate is determined according to motion information of a sub block. There are at least three availability results of the sub motion information candidates of the multiple sub blocks, including: a first result is that the sub motion information candidates of the multiple sub blocks are all available, a second result is that the sub motion information candidates of the multiple sub blocks are all unavailable, and a third result is that at least one sub motion information candidate of the sub motion information candidates of the multiple sub blocks is available.

The control unit 220 is configured to update the motion information candidate list by using one sub motion information candidate of at least one available sub motion information candidate.

Specifically, there may be one or multiple available sub motion information candidates. A sub block that is located at an edge location and that is one of the multiple sub motion information candidates may be selected to update the motion information candidate list, or a sub motion information candidate of a sub block that is located at a non-edge location and that is one of the multiple sub blocks may be used to update the motion information candidate list. As shown in FIG. 3, a sub motion information candidate of any sub block of sub block 0, sub block 1, sub block 2, sub block 3, sub block 4, sub block 7, sub block 8, sub block 11, sub block 12, sub block 13, sub block 14, and sub block 15 may be selected to update the motion information candidate list, or a sub motion information candidate of any sub block of sub block 5, sub block 6, sub block 9, and sub block 10 may be selected to update the motion information candidate list.

Preferably, a sub motion information candidate of a sub block that is located at a non-edge location and that is one of the multiple sub blocks is used to update the motion information candidate list, that is, the sub motion information candidate of any sub block of sub block 5, sub block 6, sub block 9, and sub block 10 is selected to update the motion information candidate list.

In addition, the updating manners used by the control unit 220 specifically include at least the following:

1: The control unit 220 is configured to insert the sub motion information candidate in front of a first candidate in the motion information candidate list when a texture image is processed. That is, an updated motion information candidate list is IV-MCP->A1->B1->B0->A0->B2->TMVP. In the implementation manner, the texture image is specifically a color image.

2: The control unit 220 is configured to insert the sub motion information candidate into a location, except in front of a first candidate, in the motion information candidate list when a depth image is processed. That is, an updated motion information candidate list may be A1->IV-MCP->B1->B0->A0->B2->TMVP, or may be A1->B1->IV-MCP->B0->A0->B2->TMVP, or the like. In the implementation manner, the depth image is specifically a grayscale image, and each pixel grayscale value represents depth information.

3: The control unit 220 is configured to replace a first candidate in the motion information candidate list with one sub motion information candidate of the multiple sub motion information candidates. That is, an updated motion information candidate list is IV-MCP->B1->B0->A0->B2->TMVP.

In addition, if the sub motion information candidates of the multiple sub motion blocks are all unavailable, there is no need to update the motion information candidate list.

In the foregoing motion vector list constructing system for video coding, after an obtaining unit 210 obtains a motion information candidate list of a current prediction block and sub motion information candidates of multiple sub blocks of the current prediction block, a control unit 220 directly updates the motion information candidate list by using one sub motion information candidate of at least one available sub motion information candidate of the sub motion information candidates of the multiple sub blocks, and there is no need to determine whether sub motion information that is used to update the motion information candidate list is the same as motion information of a candidate in the candidate list, or further to determine whether to update the motion information candidate list, thereby reducing complexity of constructing the motion vector list of the current prediction block, reducing time spent, and resolving a technical problem in the prior art that complexity of constructing a motion vector list is relatively high, and time spent is relatively long, where the problem is caused by: in a process of constructing a motion vector list, one candidate needs to be selected from the motion information candidate list, and motion information of the candidate and information about a location of the candidate in the list need to be obtained; when the candidate has motion information, it is determined whether the motion information of the candidate is the same as motion information of the preferred sub motion information candidate; and then it is determined whether to insert the preferred sub motion information candidate into the motion information candidate list.

In a specific implementation process, the determining unit 230 is specifically configured to determine whether the multiple sub blocks have motion information, and determine whether the multiple sub motion information candidates are available according to whether the multiple sub blocks have motion information, where specific determining manners are as follows:

First manner: when the multiple sub blocks all have no motion information, the determining unit 230 directly determines that the multiple sub motion information candidates are unavailable, where the motion information candidate list does not need to be updated.

Second manner: when at least one sub block of the multiple sub blocks has no motion information, the control unit 220 fills in the at least one sub block having no motion information with motion information, and then the determining unit 230 determines whether motion information of the multiple sub blocks is the same. When the motion information of all the sub blocks is the same, the determining unit 230 is configured to determine that the sub motion information candidates are unavailable. When the motion information of all the sub blocks is different, the determining unit 230 may also be configured to determine that the sub motion information candidates are available; the control unit 220 is configured to insert the sub motion information candidate before the first candidate in the motion information candidate list when a texture image is processed; and the control unit 220 is configured to insert the sub motion information candidate into a location, except before the first candidate, in the motion information candidate list when a depth image is processed.

When the motion information of all the sub blocks is the same, motion information of the sub motion information candidates of the sub blocks actually has degenerated from a sub block level to a prediction block level, and in this case, a possibility that a sub motion information candidate is the same as a candidate in the motion information candidate list is relatively high, and therefore, the sub motion information candidate may be processed as unavailable, thereby further helping to reduce a possibility that a final motion information candidate list includes same candidates, and helping to increase coding compression performance.

Specifically, when the control unit 220 is needs to fill in the at least one sub block having no motion information with motion information, motion information of a time-domain corresponding sub block or a spatially neighboring sub block of the at least one sub block having no motion information may be used to fill in the at least one sub block having no motion information with motion information. Specifically, the time-domain corresponding sub block of the at least one sub block is a corresponding sub block at a frame before a frame at which the at least one sub block is located, and the spatially neighboring sub block of the at least one sub block is a sub block spatially neighboring to the at least one sub block.

Third manner: when at least one sub block of the multiple sub blocks has no motion information, the control unit 220 is configured to fill in the at least one sub block having no motion information with motion information, and then determine whether motion information of the multiple sub blocks is the same. In the manner, a manner for filling in the at least one sub block having no motion information with motion information is the same as a manner, in the second manner, of filling in the at least one sub block having no motion information with motion information.

When the motion information of all the sub blocks is the same, the determining unit 230 is configured to determine the multiple sub motion information candidates as the at least one available sub motion information candidate. In this case, the control unit 220 is specifically configured to replace the first candidate in the motion information candidate list with one sub motion information candidate of the multiple sub motion information candidates.

When the motion information of all the sub blocks is different, the determining unit 230 may also be configured to determine that the sub motion information candidates are available, and in this case, the control unit 220 is configured to insert the sub motion information candidate before the first candidate in the motion information candidate list when a texture image is processed, and the control unit 220 is configured to insert the sub motion information candidate into a location, except before the first candidate, in the motion information candidate list when a depth image is processed.

When the motion information of all the sub blocks is the same, motion information of the sub motion information candidates of the sub blocks actually has degenerated from a sub block level to a prediction block level, and in this case, a possibility that a sub motion information candidate is the same as a candidate, especially the first candidate, in the motion information candidate list is relatively high, and therefore, the first candidate in the motion information candidate list may further be directly replaced with the sub motion information candidate. A sub motion information candidate is a motion information candidate obtained by inter-view prediction (obtained based on motion relevance prediction of different views), and has higher prediction accuracy compared with a candidate (obtained based on motion relevance prediction of a space-domain neighboring block and a time-domain corresponding block that are of a current view) in the motion information candidate list, and therefore, the manner of directly replacing the first candidate in the motion information candidate list with the sub motion information candidate not only avoids a possibility that the original first candidate is the same as the first candidate in the motion information candidate list, but also a sub motion information candidate having higher prediction accuracy may be used, thereby helping to increase coding compression performance.

Fourth manner: when the multiple sub blocks all have motion information, it is directly determined whether the motion information of the multiple sub blocks is the same, and when the motion information of all the sub blocks is the same, it is determined that the multiple sub motion information candidates are all unavailable.

When the motion information of all the sub blocks is the same, motion information of the sub motion information candidates of the sub blocks actually has degenerated from a sub block level to a prediction block level, and in this case, a possibility that a sub motion information candidate is the same as a candidate in the motion information candidate list is relatively high, and therefore, the sub motion information candidate may be processed as unavailable, thereby further helping to reduce a possibility that a final motion information candidate list includes same candidates, and helping to increase coding compression performance.

When the motion information of all the sub blocks is different, the determining unit 230 may determine that the sub motion information candidates are available, and in this case, the control unit 220 is configured to insert the sub motion information candidate before the first candidate in the motion information candidate list when a texture image is processed, and the control unit 220 is configured to insert the sub motion information candidate into a location, except before the first candidate, in the motion information candidate list when a depth image is processed.

Fifth manner: when the multiple sub blocks all have motion information, it is directly determined whether the motion information of the multiple sub blocks is the same. When the multiple pieces of motion information are the same, the determining unit 230 determines the multiple sub motion information candidates as the at least one available sub motion information candidate. In this case, the control unit 220 is specifically configured to replace the first candidate in the motion information candidate list with one sub motion information candidate of the multiple sub motion information candidates.

When the motion information of all the sub blocks is the same, motion information of the sub motion information candidates of the sub blocks actually has degenerated from a sub block level to a prediction block level, and in this case, a possibility that a sub motion information candidate is the same as a candidate, especially the first candidate, in the motion information candidate list is relatively high, and therefore, the first candidate in the motion information candidate list may further be directly replaced with the sub motion information candidate. A sub motion information candidate is a motion information candidate obtained by inter-view prediction (obtained based on motion relevance prediction of different views), and has higher prediction accuracy compared with a candidate (obtained based on motion relevance prediction of a space-domain neighboring block and a time-domain corresponding block that are of a current view) in the motion information candidate list, and therefore, the manner of directly replacing the first candidate in the motion information candidate list with the sub motion information candidate not only avoids a possibility that the original first candidate is the same as the first candidate in the motion information candidate list, but also a sub motion information candidate having higher prediction accuracy may be used, thereby helping to increase coding compression performance.

When the motion information of all the sub blocks is different, the determining unit 230 may also determine that the sub motion information candidates are available, and in this case, the control unit 220 is specifically configured to insert the sub motion information candidate before the first candidate in the motion information candidate list when a texture image is processed, and the control unit 220 is specifically configured to insert the sub motion information candidate into a location, except before the first candidate, in the motion information candidate list when a depth image is processed.

Sixth manner: when all or at least one of the multiple sub blocks has motion information, the determining unit 230 determines a sub motion information candidate corresponding to a sub block having motion information as the at least one available sub motion information candidate. That is, when one sub block of the multiple sub blocks has motion information, a sub motion information candidate corresponding to the sub block is directly determined as the at least one available sub motion information candidate; and when all of or at least one sub block of the multiple sub blocks has motion information, no matter whether the motion information is the same, a sub motion information candidate corresponding to a sub block having motion information may be directly determined as the available motion information candidate.

In this case, the control unit 220 is specifically configured to insert the sub motion information candidate before the first candidate in the motion information candidate list when a texture image is processed, and the control unit 220 is specifically configured to insert the sub motion information candidate into a location, except before the first candidate, in the motion information candidate list when a depth image is processed.

Specifically, it may be determined whether the sub block has motion information according to a coding manner of the sub block; if the coding manner of the sub block is intra-frame coding, it is determined that the sub block has no motion information; or if the coding manner of the sub block is inter-frame coding, it is determined that the sub block has motion information.

Further, after the control unit 220 fills in a sub block having no motion information with motion information by using motion information of a sub block having motion information, or when the multiple sub blocks all have motion information, and the motion information of the multiple sub blocks is the same, that the control unit 220 updates the motion information candidate list by using one sub motion information candidate of the multiple sub motion information candidates is specifically that: the control unit 220 replaces the first candidate in the motion information candidate list with one sub motion information candidate of the multiple sub motion information candidates. That is, A1 in the motion information candidate list is directly replaced with the sub motion information candidate (IV-MCP), that is, an updated motion information candidate list is IV-MCP->B1->B0->A0->B2->TMVP.

The foregoing motion vector list constructing system 200 can execute all the steps of the method in Embodiment 1.

In the foregoing motion vector list constructing system for video coding, after an obtaining unit 210 obtains a motion information candidate list of a current prediction block and sub motion information candidates of multiple sub blocks of the current prediction block, the control unit 220 directly updates the motion information candidate list by using one sub motion information candidate of at least one available sub motion information candidate of the sub motion information candidates of the multiple sub blocks, and there is no need to determine whether sub motion information that is used to update the motion information candidate list is the same as motion information of a candidate in the candidate list, or further to determine whether to update the motion information candidate list, thereby reducing complexity of constructing the motion vector list of the current prediction block, reducing time spent, and resolving a technical problem in the prior art that complexity of constructing a motion vector list is relatively high, and time spent is relatively long, where the problem is caused by: in a process of constructing a motion vector list, one candidate needs to be selected from the motion information candidate list, and motion information of the candidate and information about a location of the candidate in the list need to be obtained; when the candidate has motion information, it is determined whether the motion information of the candidate is the same as motion information of the preferred sub motion information candidate; and then it is determined whether to insert the preferred sub motion information candidate into the motion information candidate list.

Embodiment 3

Figure 5:
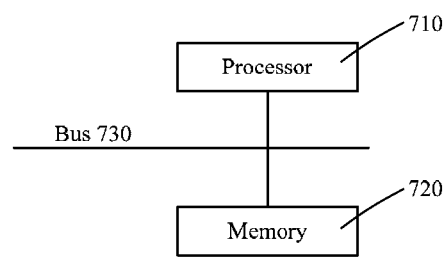
FIG. 5 is a schematic structural diagram of a video coding device according to yet another implementation manner of this application.

As shown in FIG. 5, based on a same inventive idea and the foregoing embodiments, the embodiment of the present invention provides a video coding device, where the device includes a processor 710 and a memory 720 that are connected to a bus 730, and a physical interface configured to connect to another device (which is not shown herein).

The processor 710 is designed and programmed, and code corresponding to the method shown in the foregoing is fixedly stored in the memory 720, so that the processor 710, when running, can execute an instruction stored in the memory 720, so as to implement the method shown in the foregoing embodiment. How the processor 710 is designed and programmed is a known technology to a person skilled in the art, and is not repetitively described herein.

In the foregoing video coding device, after a motion information candidate list of a current prediction block and sub motion information candidates of multiple sub blocks of the current prediction block are obtained, the motion information candidate list is directly updated, when the sub motion information candidates of the multiple sub blocks are available, by using an available sub motion information candidate of the multiple sub motion information candidates, and there is no need to determine whether sub motion information that is used to update the motion information candidate list is the same as motion information of a candidate in the candidate list, and then to determine whether to update the motion information candidate list, thereby reducing complexity of constructing the motion vector list of the current prediction block, reducing time spent, and resolving a technical problem in the prior art that complexity of constructing a motion vector list is relatively high, and time spent is relatively long, where the problem is caused by: in a process of constructing a motion vector list, one candidate needs to be selected from the motion information candidate list, and motion information of the candidate and information about a location of the candidate in the list need to be obtained; when the candidate has motion information, it is determined whether the motion information of the candidate is the same as motion information of the preferred sub motion information candidate; and then it is determined whether to insert the preferred sub motion information candidate into the motion information candidate list.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely used to describe the technical solutions of the present application. The foregoing embodiments are merely intended to help understand the method and core idea of the present invention, and shall not be construed as a limitation on the present invention. Any variation or replacement readily figured out by a person skilled in the art within the technical scope disclosed in the present invention shall fall within the protection scope of the present invention.

What is claimed is:

1. A method of constructing a motion vector list for video coding implemented by hardware configured to provide obtaining, determining and control units, the method comprises:
   obtaining, by the obtaining unit, a motion information candidate list for a current prediction block that is based on a spatially neighboring block and a time-domain corresponding block;
   obtaining, by the obtaining unit, sub-motion information candidates from motion information of multiple sub blocks of the current prediction block based on corresponding inter-view blocks of the multiple sub-blocks;
   always selecting, by the determining unit, one of the sub-motion information candidates for updating the motion information candidate list without first determining whether motion information of the selected sub-motion information candidate is already in the motion information candidate list; and
   updating, by the control unit, the motion information candidate list with the selected sub-motion information candidate by
   a) inserting the sub-motion information candidate in front of a first candidate in the motion information candidate list when a texture image is processed; or
   b) inserting the sub motion information candidate into a location, other than a location in front of a first candidate, in the motion information candidate list when a depth image is processed.

2. The method according to claim 1, further comprising:
determining whether all of the multiple sub-blocks have motion information; and
replacing a first candidate in the motion information candidate list with the selected sub-motion information candidate.

3. The method according to claim 1, further comprising:
determining whether one or more but less than all of the multiple sub-blocks have no motion information;
providing motion information to the one or more sub-blocks having no motion information; and
replacing a first candidate in the motion information candidate list with the selected sub-motion information candidate when the motion information of the multiple sub-blocks is determined to be all the same.

4. The method according to claim 3 including
filling in each of the one or more sub-blocks having no motion information with motion information of a time-domain corresponding sub-block or a spatially neighboring sub-block of the one or more sub-blocks having no motion information.

5. The method according to claim 1, wherein the selected sub motion information candidate is located at a non-edge location.

6. A system for constructing a motion vector list for video coding, the system comprises:
a processor; and
non-transitory computer readable medium storing instructions for execution by the processor that, when executed, configures the processor to perform the following method:
obtaining a motion information candidate list for a current block that is based on a spatially neighboring block and a time-domain corresponding block; and
obtaining submotion information candidates from motion information of multiple sub-blocks of the current prediction block based on corresponding inter-view blocks of the multiple sub-blocks;
always selecting one of the sub-motion information candidates for updating the motion information candidate list without first determining whether motion information of the selected sub-motion information candidate is already in the motion information candidate list; and
updating the motion information candidate list with the selected sub-motion information candidate by
a) inserting the sub-motion information candidate in front of a first candidate in the motion information candidate list when a texture image is processed; or
b) inserting the sub motion information candidate into a location, other than a location in front of a first candidate, in the motion information candidate list when a depth image is processed.

7. The system according to claim 6, wherein the processor is further configured to:
determine whether all of the multiple sub blocks have motion information;
replace a first candidate in the motion information candidate list with the selected sub-motion information candidate when the motion information of the multiple sub-blocks is determined to be all the same.

8. The system according to claim 6, wherein the processor is further configured to:
determine whether one or more but less than all of the multiple sub-blocks have no motion information;
provide motion information to the one or more sub-blocks having no motion information; and
replace a first candidate in the motion information candidate list with the selected sub-motion information candidate when the motion information of the multiple sub-blocks is determined to be all the same.

9. The system according to claim 8, wherein the processor is configured to fill in each of the one or more sub-blocks having no motion information with motion information using motion information of a time-domain corresponding sub-block or a spatially neighboring sub-block of the one or more sub-blocks having no motion information.

10. The system according to claim 6, wherein the selected motion information candidate is located at a non-edge location.

11. A non-transitory, computer readable medium containing instructions for execution by a processor, where the processor is configured to provide the following acts when executing the instructions:
obtaining a motion information candidate list for a current prediction block that is based on a spatially neighboring block and a time-domain corresponding block;
obtaining sub-motion information candidates from motion information of multiple sub blocks of the current prediction block based on corresponding inter-view blocks of the multiple sub-blocks;
always selecting one of the sub-motion information candidates for updating the motion information candidate list without first determining whether motion information of the selected sub-motion information candidate is already in the motion information candidate list; and
updating the motion information candidate list with the selected sub-motion information candidate by
a) inserting the sub-motion information candidate in front of a first candidate in the motion information candidate list when a texture image is processed; or
b) inserting the sub motion information candidate into a location, other than a location in front of a first candidate, in the motion information candidate list when a depth image is processed.

12. The computer readable medium of claim 11 further comprising instructions for configuring the processor to:
determine whether all of the multiple sub-blocks have motion information; and
replace a first candidate in the motion information candidate list with the selected sub motion information candidate.

13. The computer readable medium of claim 11 further comprising instructions for configuring the processor to:
determine whether one or more but less than all of the multiple sub-blocks have no motion information;
provide motion information to the one or more sub-blocks having no motion information; and
replace a first candidate in the motion information candidate list with the selected sub motion information candidate when the motion information of the multiple sub-blocks is determined to be all the same.

14. The computer readable medium of claim 13 further comprising instructions for configuring the processor to:
fill in each of the one or more sub-blocks having no motion information with motion information of a time-domain corresponding sub-block or a spatially neighboring sub-block of the one or more sub-blocks having no motion information.

15. The computer readable medium of claim 11, wherein the selected sub motion information candidate is located at a non-edge location.

\* \* \* \* \*